United States Patent [19]

Ellis, Jr. et al.

[11] Patent Number: 5,724,177
[45] Date of Patent: Mar. 3, 1998

[54] ELECTROCHROMIC DEVICES AND METHODS

[75] Inventors: Frank B. Ellis, Jr., Princeton; John E. Van Dine, Mahwah; V. D. Parkhe, Edison, all of N.J.

[73] Assignee: Sun Active Glass Electrochromics, Inc., Piscataway, N.J.

[21] Appl. No.: 434,159

[22] Filed: May 2, 1995

Related U.S. Application Data

[63] Continuation of Ser. No. 996,676, Dec. 24, 1992, Pat. No. 5,485,303, which is a continuation-in-part of Ser. No. 754,650, Sep. 4, 1991, Pat. No. 5,321,544.

[51] Int. Cl.[6] ............................................. G02F 1/153
[52] U.S. Cl. ..................... 359/273; 359/274; 359/265; 359/275
[58] Field of Search .............................. 359/265, 266, 359/273, 274, 275

[56] References Cited

U.S. PATENT DOCUMENTS

| | | | |
|---|---|---|---|
| 3,521,941 | 7/1970 | Deb et al. | 359/275 |
| 3,578,843 | 5/1971 | Castellion | 359/267 |
| 3,589,896 | 6/1971 | Wilcox | 359/321 |
| 3,682,528 | 8/1972 | Apfel et al. | 359/360 |
| 3,712,710 | 1/1973 | Castellion et al. | 359/267 |
| 3,736,047 | 5/1973 | Gelber et al. | 359/71 |
| 4,053,209 | 10/1977 | Hara et al. | 359/274 |
| 4,166,876 | 9/1979 | Chiba et al. | 428/215 |
| 4,182,551 | 1/1980 | Washida et al. | 359/274 |
| 4,187,336 | 2/1980 | Gordon | 428/34 |
| 4,226,910 | 10/1980 | Dahlen et al. | 428/336 |
| 4,256,379 | 3/1981 | Green | 359/270 |
| 4,293,194 | 10/1981 | Takahashi | 359/275 |
| 4,308,316 | 12/1981 | Gordon | 428/336 |
| 4,377,613 | 3/1983 | Gordon | 428/212 |
| 4,413,877 | 11/1983 | Suzuki et al. | 359/360 |
| 4,419,386 | 12/1983 | Gordon | 427/109 |
| 4,440,822 | 4/1984 | Gordon | 428/216 |
| 4,462,883 | 7/1984 | Hart | 204/192.26 |
| 4,465,339 | 8/1984 | Baucke et al. | 359/274 |
| 4,750,816 | 6/1988 | Ito et al. | 359/268 |
| 4,824,222 | 4/1989 | Green | 359/275 |
| 4,876,628 | 10/1989 | Goldner | 361/313 |
| 4,902,110 | 2/1990 | Green | 359/275 |
| 5,007,718 | 4/1991 | Minoura et al. | 359/265 |
| 5,076,673 | 12/1991 | Lynam et al. | 359/271 |
| 5,130,842 | 7/1992 | Gauthier et al. | 359/275 |
| 5,133,594 | 7/1992 | Haas et al. | 359/275 |
| 5,138,481 | 8/1992 | Demiryont | 359/275 |

FOREIGN PATENT DOCUMENTS

| | | | |
|---|---|---|---|
| 0434453A2 | 6/1991 | European Pat. Off. | |
| 54-101345 | 8/1979 | Japan | |
| 54-120688 | 9/1979 | Japan | |
| 159927 | 3/1980 | Japan | 359/275 |
| 55-088028 | 7/1980 | Japan | |
| 55-100530 | 7/1980 | Japan | |
| 58-037622 | 3/1983 | Japan | |
| 0105217 | 6/1983 | Japan | |
| 60-021030 | 2/1985 | Japan | |
| 62-220932 | 9/1987 | Japan | |
| 0277826 | 11/1989 | Japan | |
| 1511564 | 5/1978 | United Kingdom | |
| 8909428 | 10/1989 | WIPO | |
| 8912844 | 12/1989 | WIPO | |
| WO89/12033 | 12/1989 | WIPO | |

OTHER PUBLICATIONS

Hecht, et al., "Optics", *Addison–Wesley Series in Physics*, (Addison–Wesley Publishing Co., Reading, MA 1979), pp. 311–316.

*Primary Examiner*—David C. Nelms
*Assistant Examiner*—Evelyn A. Lester
*Attorney, Agent, or Firm*—Lerner, David, Littenberg, Krumholz & Mentlik

[57] ABSTRACT

Electrochromic devices are disclosed which may be used for large surface area applications. The devices utilize optical tuning to minimize optical interference between layers of the structure and to maximize uniform optical transparency. Optical tuning also enables transparent conductive oxide layers to be replaced by thin conductive metal layers, thereby reducing the overall thickness of these devices and facilitating the manufacturing process.

19 Claims, 6 Drawing Sheets

ELECTROCHROMIC DEVICES AND METHODS

This is a continuation of application Ser. No. 07/996,676 filed Dec. 24, 1992, U.S. Pat. No. 5,485,303 which is a continuation-in-part of Ser. No. 07/754,650 filed on Sep. 4, 1991, now U.S. Pat. No. 5,321,544.

FIELD OF THE INVENTION

The present invention relates to electrochromic devices through which energy, including light, can be transmitted under controlled conditions. More particularly, the present invention is directed to improved electrochromic devices which are usable over large surfaces, as well as methods for manufacturing these devices.

BACKGROUND OF THE INVENTION

Certain materials, referred to as electrochromic materials, are known to change their optical properties in response to the application of an electric current or an electric potential. This property has been taken advantage of to produce electrochromic devices which can be controlled to transmit optical energy selectively. Such electrochromic devices typically have a structure consisting of sequential layers including a layer of an electrically conducting material, an electrode formed from a layer of an electrochromic material, an ion conductive layer, a counterelectrode layer, and another electrically conductive layer. In a first condition of the electrochromic device, each of the aforementioned layers is optically transparent such that a majority of the optical energy incident on the device will be transmitted therethrough. Upon the application of an electric potential across these layers, however, the optical properties of the electrochromic material will change such that the electrochromic layer will become less transparent, thereby preventing the transmission of much of the optical energy.

One of the most significant potential uses of these electrochromic devices is to control the transmission of optical energy through windows, and particularly the large windows of office buildings and other such structures. By selectively controlling the transmission of optical energy through these windows, tremendous cost savings in terms of heating and cooling these buildings can be realized. To date, however, efforts to capitalize on this potential benefit have largely failed. One reason for this failure has been the inability of the industry to produce economically an electrochromic device that can be used effectively over large surfaces. Those devices which have been available heretofore have exhibited an undesirable mosaic of different colors or an iridescent affect when used over large surface areas. Since the color of these devices is directly related to the thicknesses of the various layers, variations in layer thickness result in color changes from region to region, thereby producing this iridescent affect. The extremely tight tolerances which are required to overcome this difficulty make the use of these devices for large surface area applications largely uneconomical.

A further obstacle to the widespread commercialization of large surface area electrochromic devices relates to the understanding in this field that optically transparent conductive materials must be used to apply an electric potential across these devices so that the optical transparency of these devices will not be compromised. Preferably, the conductive layers formed from these materials have a low sheet resistance in order to effect a sufficiently rapid and uniform change in optical properties throughout the device. These layers are typically formed from costly transparent conductive metal oxides. The relatively thick layers of these oxides needed to get an acceptably low sheet resistance for large surface area devices tends to decrease their overall transparency. Moreover, in view of the high cost of these materials, the relatively large quantities required makes the use of these materials uneconomical.

There therefore exists a need for improved electrochromic devices which will provide an acceptable appearance when used over large surface areas. There exists a further need for such electrochromic devices which can be produced efficiently and economically, and which therefore will be available for widespread commercial use.

SUMMARY OF THE INVENTION

The present invention addresses these needs.

One aspect of the present invention provides an electrochromic device consisting of an electrochromic structure including an electrode formed from an electrochromic material, a counterelectrode and transporting means for transporting ions between the electrode and the counterelectrode. Conductive means including at least two electrically conductive layers sandwich the electrochromic structure so that an electric potential can be applied to the structure. The electrochromic device further includes enhancing means for enhancing the transmission of radiation through at least one of the electrically conductive layers. Preferably, the electrode, the counterelectrode and the ion conductive layers are selected to all have about the same index of refraction.

In preferred embodiments, the enhancing means comprises at least one layer of an optically transparent material in surface contact with the at least one electrically conductive layer. Preferably, the optically transparent material is a transparent oxide, a transparent nitride, or a combination thereof. In some highly preferred embodiments, the optically transparent material comprises a mixture of silicon oxide and tin oxide.

The transporting means desirably includes at least one layer formed from an ion conducting material sandwiched between the electrode and the counterelectrode. In these embodiments, the electrochromic material is preferably formed from tungsten oxide, niobium oxide, titanium oxide, molybdenum oxide, nickel oxide, iridium oxide, or mixtures thereof. The counterelectrode is preferably formed from vanadium oxide, niobium oxide, indium oxide, nickel oxide, cobalt oxide, molybdenum oxide or mixtures thereof. The ion conducting material may be a lithium ion conducting material such as lithium silicate, lithium borosilicate, lithium aluminum silicate, lithium niobate, lithium nitride, or lithium aluminum fluoride. Alternatively, the ion conducting material may be a hydrogen ion conducting material such as silicon dioxide or tantalum pentoxide. Preferably, the electrode, the counterelectrode and the ion conducting layer are selected to all have about the same index of refraction. This may be accomplished by adjusting the index of refraction of these materials by additions of oxides having different indices of refraction.

In one embodiment in accordance with this aspect of the invention, the electrochromic device further includes a substrate in surface contact with the at least one layer of an optically transparent material, the substrate having a first index of refraction, the at least one electrically conductive layer having a second index of refraction, and the at least one layer of an optically transparent material having a third index of refraction between the first and second indices of refraction. In preferred electrochromic devices in accordance with this embodiment, the index of refraction of the at least one layer of an optically transparent material is about equal to the square root of the mathematical product of the first and second indices of refraction. Also, the at least one layer of an optically transparent material preferably has a thickness which is inversely proportional to the index of refraction of the at least one layer of an optically transparent material, and more preferably between about 60 nm and about 90 nm.

In another embodiment, the enhancing means may consist of a series of optically transparent layers beginning with a first optically transparent layer in surface contact with the at least one electrically conductive layer and ending with an nth optically transparent layer. This embodiment of the device may further consist of a substrate in surface contact with the nth optically transparent layer, the at least one electrically conductive layer having a first index of refraction and the substrate having a second index of refraction less than the first index of refraction. In this embodiment, the index of refraction of the first optically transparent layer is less than the first index of refraction, the index of refraction of the nth optically transparent layer is greater than the second index of refraction, and the index of refraction of each one of the series of optically transparent layers decreases monotonically from the index of refraction of the first transparent layer to the index of refraction of the nth transparent layer.

In still another embodiment, the enhancing means may consist of two optically transparent layers, one of the optically transparent layers being in surface contact with the at least one electrically conductive layer and another of the optically transparent layers being in surface contact with the one optically transparent layer. In this embodiment, the at least one electrically conductive layer has a first index of refraction, the one of the optically transparent layers has an index of refraction which is less than the first index of refraction, and the another of the optically transparent layers has an index of refraction which is greater than the index of refraction of the one of the optically transparent layers. In preferred embodiments of this device, the one of the optically transparent layers has an index of refraction between about 1.4 and about 1.7, and the other of the optically transparent layers has an index of refraction about equal to or greater than the first index of refraction. Further, the two optically transparent layers of preferred devices in accordance with this embodiment have a combined thickness of between about 30 nm and about 70 nm.

In yet another embodiment, at least one of the electrically conductive layers includes a layer of a first electrically conductive metal. Preferably, this first electrically conductive metal layer has a thickness of between about 5 nm and about 15 nm, and more preferably between about 7 nm and about 12 nm. Optionally, this embodiment may further include an intermediate layer disposed between the electrochromic structure and the first electrically conductive metal layer. This intermediate layer may be formed from a second electrically conductive metal, and preferably a metal which is more stable than the first electrically conductive metal, or from an electrically conductive oxide.

Preferably, the enhancing means in this last embodiment includes at least one layer of an optically transparent material in surface contact with the first electrically conductive metal layer. Still more preferably, the optically transparent material comprises an electrically conductive oxide. Preferred optically transparent materials have an index of refraction greater than about 1.9, and desirably between about 1.9 and about 2.8, and a thickness of between about 10 nm and about 50 nm, and more preferably between about 23 nm and about 45 nm.

In still another embodiment of the present invention, at least one of the electrically conductive layers includes a layer of an electrically conductive oxide, and preferably an oxide having about the same index of refraction as the electrode, the counterelectrode and the ion conducting layer. Electrochromic devices in accordance with this embodiment may further include a layer of an electrically conductive metal in surface contact with the electrically conductive oxide layer. In preferred embodiments, the electrically conductive oxide layer is disposed between the electrochromic structure and the conductive metal layer. Desirably, the enhancing means in these embodiments includes at least one layer of an optically transparent material having an index of refraction greater than about 1.9 in surface contact with the conductive metal layer. Preferably, these optically transparent layers have a thickness of between about 10 nm and about 50 nm.

A further aspect of the present invention provides an electrochromic combination consisting of a transparent substrate and an electrochromic device arranged on the transparent substrate. The electrochromic device may generally consist of an electrochromic structure including an electrode formed from an electrochromic material, a counterelectrode and transporting means for transporting ions between the electrode and the counterelectrode. The electrochromic device may further consist of conductive means including at least two electrically conductive layers sandwiching the electrochromic structure for applying an electric potential to the electrochromic structure, and enhancing means for enhancing the transmission of radiation through at least one of the electrically conductive layers.

Preferred embodiments in accordance with this aspect of the present invention may further include a transparent superstrate, wherein the electrochromic device is sandwiched between the transparent substrate and the transparent superstrate. A layer of an adhesive material may be used to bind the transparent superstrate to the electrochromic device. Such adhesive layer preferably has an index of refraction between about 1.4 and about 1.8, which index of refraction is preferably substantially equal to the index of refraction of the superstrate. Optionally, the at least one electrically conductive layer may include a layer of an electrically conductive oxide, and the adhesive layer may be in surface contact with the electrically conductive oxide layer. In that event, the adhesive layer preferably has an index of refraction between the index of refraction of the electrically conductive oxide layer and the index of refraction of the superstrate.

BRIEF DESCRIPTION OF THE DRAWINGS

A more complete appreciation of the subject matter of the present invention and the various advantages thereof can be realized by reference to the following detailed description, in which reference is made to the accompanying drawings in which.

DETAILED DESCRIPTION OF THE PREFERRED EMBODIMENTS

For the purpose of the present description, the electrochromic devices of the present invention are discussed in connection with their use to control the transmission of light through a window. It will be appreciated, however, that these electrochromic devices are useful in a wide variety of applications, including display devices, variable reflectance mirrors, lenses and similar devices in which the ability to selectively control the transmission of optical energy through a transparent structure would be beneficial.

Figure 1:
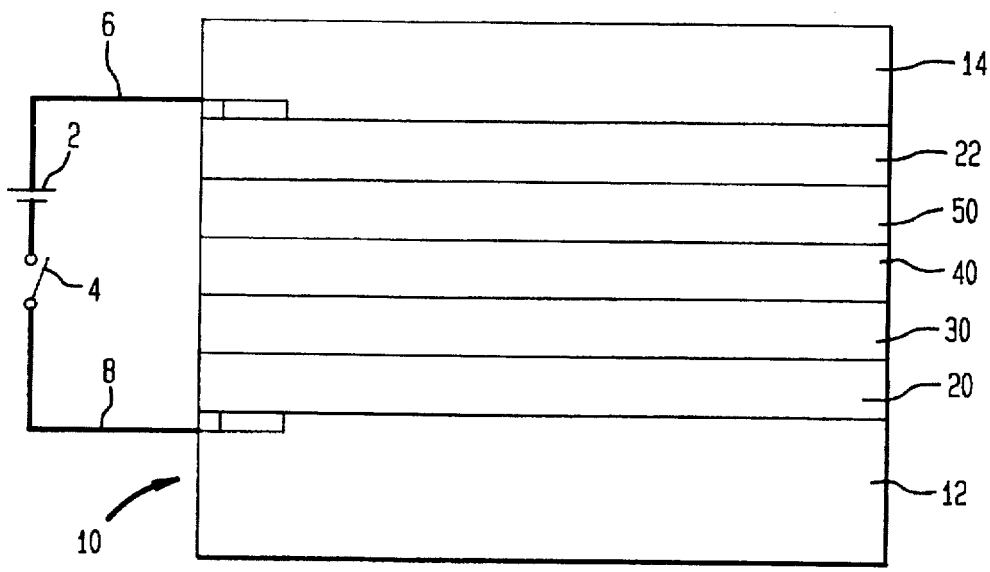
FIG. 1 is a highly schematic cross-sectional view of an electrochromic device in accordance with the prior art.

A window 10 incorporating an electrochromic device in accordance with the prior art is shown schematically in cross-section in FIG. 1. Window 10 consists of a series of sequential layers, including a transparent glass substrate 12, a transparent conductive oxide layer 20, an electrochromic electrode layer 30, an ion conducting layer 40, a counterelectrode layer 50, another transparent conductive oxide layer 22, and a transparent glass superstrate 14. A low voltage battery 2 and switch 4 are connected to the layered structure by means of conductive wires 6 and 8. In order to alter the optical properties of window 10, switch 4 is closed whereupon battery 2 will cause an electric potential to be created across the layered structure. The polarity of the battery will govern the nature of the electric potential created and thus the direction of ion and electron flow. In the embodiment shown in FIG. 1, the electric potential created as switch 4 is closed will cause ions to flow from the counterelectrode layer 50 through the ion conducting layer 40 to the electrochromic electrode layer 30, thereby reducing the electrochromic material to its so-called "colored" state. In this state, the transparency of window 10 is substantially reduced as a large portion of the optical energy incident on window 10 is absorbed and reflected by the electrochromic electrode layer 30. Window 10 is said to have a "memory" in that electrochromic layer 30 will remain in this colored state even when switch 4 is opened, provided layer 40 is also electrically insulating. However, when the polarity of battery 2 is reversed and switch 4 is closed, the applied electric potential will cause ions to flow in a reverse direction from the electrochromic electrode layer 30 through the ion conducting layer 40 to the counterelectrode layer 50, thereby oxidizing the electrochromic material to its so-called "bleached" state in which the transparency of window 10 is at a maximum.

In fabricating window 10 described above, layers 20 and 22 may be formed from any transparent oxides which are highly electron conducting, such as doped tin oxide, doped zinc oxide, tin-doped indium oxide and similar materials. The materials for forming layers 20 and 22 need not be the same. Electrochromic electrode layer 30 is typically formed from a material whose optical properties can be reversibly altered as its state of oxidation changes. The thickness of electrochromic electrode layer 30 will normally be such that, in the colored state, an acceptable reduction in the transparency of the window is obtained. A widely used material in this regard is tungsten oxide ($WO_3$), although other suitable materials may be used, such as molybdenum oxide, nickel oxide, iridium oxide, niobium oxide, titanium oxide and mixtures of the foregoing oxides. The ion conducting layer 40 is used to transport ions into and out from the electrochromic layer 30, and must exhibit and maintain two electrically opposed properties. That is, ion conducting layer 40 must readily transmit ions upon the application of an electric potential, yet must remain electrically insulating with respect to the transmission of electrons. In that regard, ion conducting layer 40 must have a thickness sufficient to avoid the possibility of electron arcing or shorting between the electrochromic electrode layer 30 and the counterelectrode layer 50. Suitable materials for forming layer 40 for the transmission of lithium ions include, for example, lithium silicate, lithium borosilicate, lithium aluminum silicate, lithium niobate, lithium nitride and lithium aluminum fluoride; and suitable materials for transmitting hydrogen ions include tantalum pentoxide and silicon dioxide. Alternatively, ion conducting layer 40 may be formed from a polymer material.

The counterelectrode layer 50 of window 10 is typically formed from a material which is capable of storing ions and then releasing these ions for transmission to electrochromic layer 30 in response to an appropriate electric potential. The thickness of this layer is preferably such that the counterelectrode is capable of transmitting a large enough quantity of ions to the electrochromic electrode layer to effect in that layer an acceptable change in color. Some counterelectrode materials are themselves also electrochromic in that their optical properties also change as they give up or receive ions in response to the application of an electric potential. These electrochromic counterelectrode materials may complement the affect that an electric potential has on the optical properties of the electrochromic electrode materials. That is, these counterelectrode materials may become less transparent as they release ions to convert the electrochromic materials to the colored state. Similarly, the counterelectrode materials may become more transparent as they receive ions upon the conversion of the electrochromic material to the bleached state. Suitable materials for forming counterelectrode layer 50 include vanadium oxide, niobium oxide, indium oxide, nickel oxide, cobalt oxide, molybdenum oxide and mixtures of the foregoing oxides.

Each of the layers described above may be deposited by known techniques, provided that discrete and continuous individual layers are formed. The particular method of deposition for each layer depends upon several parameters, including the material being deposited, the thickness of the layer being deposited, the materials deposited in previous layers, etc. Deposition techniques including RF sputtering, chemical vapor deposition, plasma enhanced chemical vapor deposition, electron beam evaporation, sol-gel techniques and other known methods for depositing thin films are typically used.

During the fabrication process, at least one of the electrochromic electrode layer 30 and the counterelectrode layer 50 may be inserted with appropriate ions, such as lithium or hydrogen ions, unless these ions are already present in one of these layers in its deposited form. Ion insertion may be accomplished by treating layer 30 or layer 50 with a suitable reducing agent. For example, n-butyl lithium may be used for lithium insertion, or aqueous sulfuric acid may be used for hydrogen insertion. Alternatively, ion insertion may be accomplished by a vacuum processing step, such as sputtering from a target serving as a source of suitable ions, such as a lithium target which decomposes to produce lithium atoms in the vapor phase. Also, hydrogen insertion may be accomplished by exposure to a hydrogen plasma. Ion insertion may also be accomplished electrochemically by reduction in an appropriate ion-containing electrolyte. A still further technique is to deposit a layer of the reduced material directly by vapor deposition in a reducing atmosphere which will react with the source or target material to form the desired composition, or by using a source or target having the reduced composition. Still another technique for insertion uses a volatile precursor and ignites a low vapor pressure discharge to dissociate the insertion ion from the precursor. For example, an organic lithium compound in the form of a gaseous precursor may be dissociated so that lithium ions come into contact with the material into which they are to be inserted.

Figure 2:
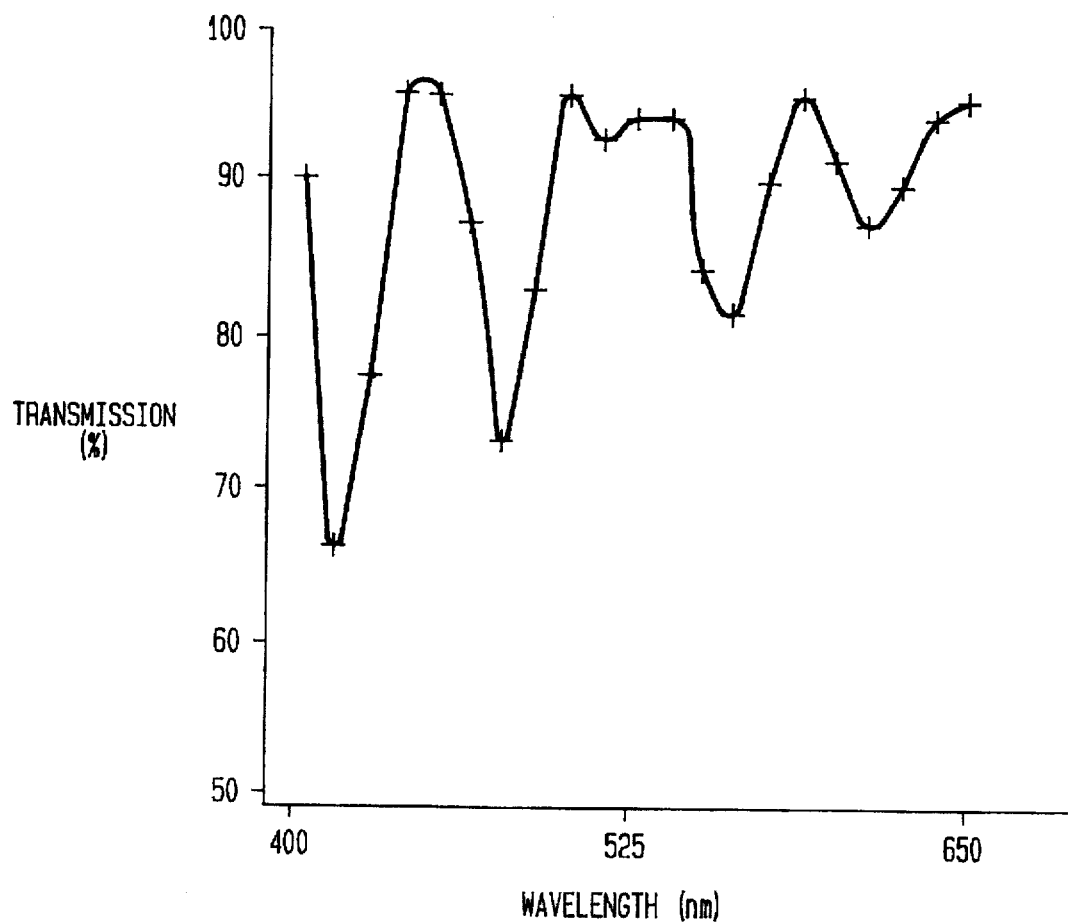
FIG. 2 is a graphical representation showing the optical transmission of the electrochromic device of FIG. 1 in the bleached state.

FIG. 2 shows the transmission of optical energy as a function of wavelength in the bleached state for a window 10 in which glass substrate 12 has an index of refraction of 1.5, transparent conductive oxide layer 20 has an index of refraction of 2.1 and a thickness of 450 nm, electrochromic electrode layer 30 has an index of refraction of 2.1 and a thickness of 300 nm, ion conducting layer 40 has an index of refraction of 1.5 and a thickness of 200 nm, counterelectrode layer 50 has an index of refraction of 2.0 and a thickness of 200 nm, transparent conductive oxide layer 22 has an index of refraction of 2.1 and a thickness of 450 nm, and glass superstrate 14 has an index of refraction of 1.5. The bleached stated is shown because it is more sensitive to the difficulties of achieving uniform optical transmission as a function of wavelength. As can be clearly seen, there is very little uniformity to the optical transmission through this layered structure, resulting in a window having a colored mosaic or iridescent affect.

Figure 3:
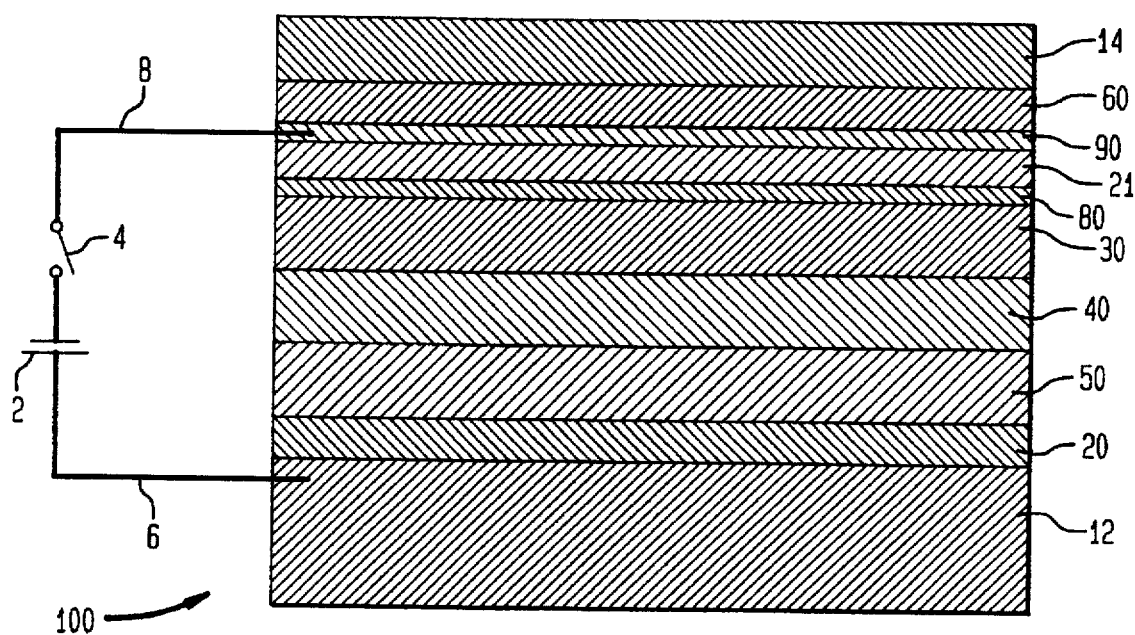
FIG. 3 is a highly schematic cross-sectional view of an electrochromic device in accordance with one embodiment of the present invention.

One aspect of the present invention overcomes the economic disadvantage and reduces the optical difficulties associated with the use of transparent conductive oxides in large surface area optically transparent electrochromic devices. An embodiment of a window 100 incorporating an electrochromic device in accordance with this aspect of the present invention is shown in schematic cross-section in FIG. 3. Window 100 is similar to window 10 described above with the positions of the electrochromic electrode layer and the counterelectrode layer reversed. Thus, window 100 includes transparent glass substrate 12, transparent conductive oxide layer 20, counterelectrode layer 50, ion conducting layer 40, and electrochromic electrode layer 30. These layers are formed from substantially the same materials as described above in connection with window 10. Rather than a second transparent conductive oxide layer 22, however, window 100 has a combination of layers including a layer 21 formed from an electrically conductive metal and a layer 60 formed from a transparent oxide which serves as an optical tuning layer. Optionally, window 100 may also include a barrier layer 80 formed from an inert or stable electrically conductive metal, such as nickel, for preventing ions from migrating from electrochromic electrode layer 30 to conductive metal layer 21, and a second layer 90 which may promote adhesion of optical tuning layer 60 to conductive metal layer 21 or may act as a barrier to prevent the dissolution of the conductive metal in layer 21 into transparent oxide layer 60. The assembly is completed by a transparent glass superstrate 14.

In the above-described structure, layer 21 may be formed from silver or another highly conductive metal, such as copper or aluminum. By using a highly conductive metal, very thin layers having little optical absorption and low sheet resistance can be formed, thereby overcoming the cost and manufacturing difficulties associated with the use of relatively thick layers of transparent conductive oxides. Preferably, layer 21 has a thickness of between about 5 nm and about 15 nm, and more preferably between about 7 nm and about 12 nm. Even though very thin layers of silver and other conductive metals are not highly optically transparent due to their high reflectivity, optical transmission therethrough may be improved by the presence of an appropriately selected optical tuning layer 60. Optical tuning layers, such as layer 60, which are used in combination with conductive metal layers preferably have a thickness between about 10 nm and about 50 nm, and more preferably between about 23 nm and about 40 nm. Preferred materials for forming optical tuning layer 60 have an index of refraction which is greater than about 1.9, and more preferably between about 1.9 and about 2.8. When optical tuning layer 60 is formed with a thickness of about 30–40 nm and with an index of refraction which is substantially the same as or greater than that for counterelectrode 30 so that the conductive metal layer 21 having a low index of refraction is sandwiched between layers 60 and 30 having higher indices of refraction, the reflected signals at the various interfaces between layers 14, 60, 21, 30 and 40 will be reduced, thereby lowering reflection and maximizing transmission. As a result, window 100 will be largely optically transparent in the bleached state of the electrochromic electrode layer 30.

Figure 4:
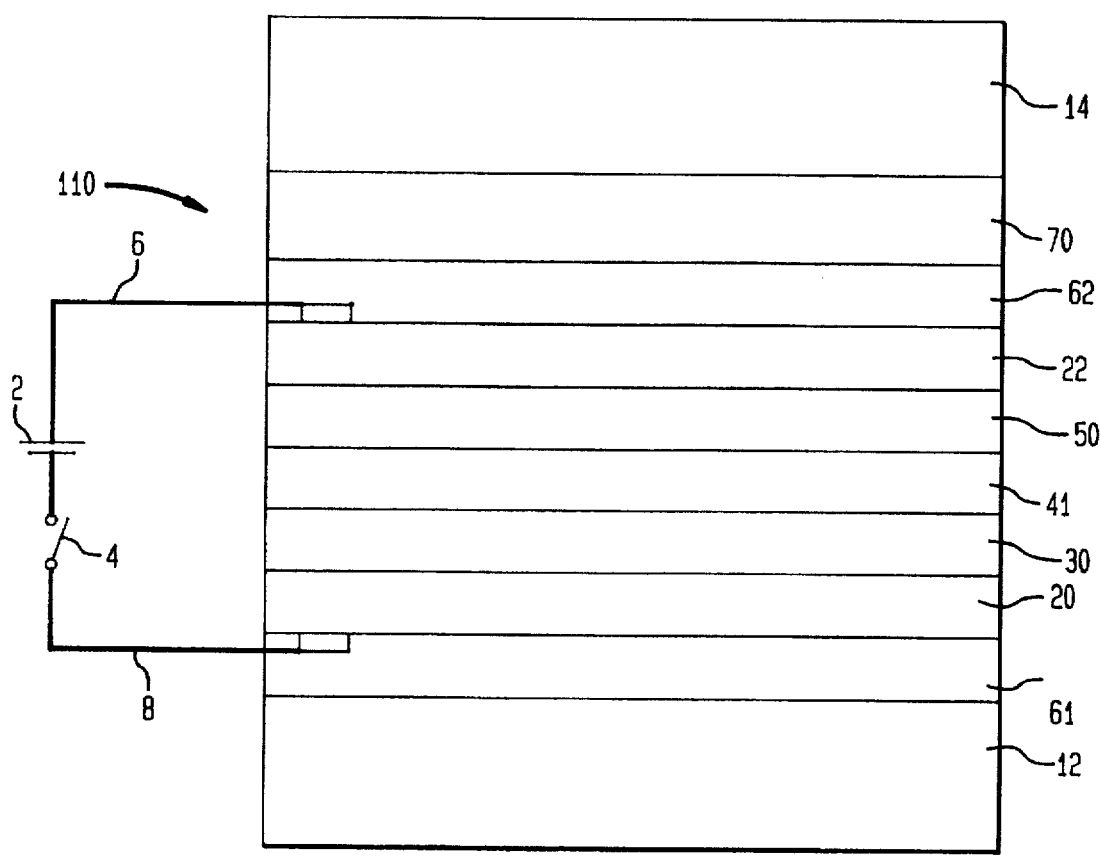
FIG. 4 is a highly schematic cross-sectional view of an electrochromic device in accordance with another embodiment of the present invention.

Further improvements in the transmission of optical energy through electrochromic devices can be realized by using the principle of an optical tuning layer, as described above, in combination with transparent conductive oxide layers. A window 110 incorporating such feature is shown in schematic cross-section in FIG. 4. Window 110 consists of a glass substrate 12, a transparent optical tuning layer 61, a transparent conductive oxide layer 20, an electrochromic electrode layer 30, an ion conducting layer 41, a counterelectrode layer 50, a transparent conductive oxide layer 22, a transparent optical tuning layer 62, a laminate layer 70, and a transparent glass superstrate 14. Each of layers 12, 20, 30, 50 and 14 are the same as described above in connection with window 100, with the positions of the electrochromic electrode layer 30 and the counterelectrode layer 50 reversed so that they are again in the orientation shown in FIG. 1. In this embodiment, conductive metal layer 21 and optical tuning layer 60 have been replaced with a transparent conductive oxide layer 22 which may or may not be formed from the same transparent conductive oxide as layer 20, and an appropriate optical tuning layer 62. In addition, an optical tuning layer 61 has been inserted to improve upon the optical transmission through window 110, and more particularly, to improve upon the uniformity of the optical transmission as a function of wavelength.

The selection of appropriate optical tuning layers 61 and 62 is made with reference to the equation $$\text{index of refraction} = n + ik$$

where n is the real component of the index of refraction, i is the square root of −1, and k is the imaginary component of the index of refraction related to absorption. In order to optimize the optical tuning effect, layers 61 and 62 are selected so that they are transparent to visible light (i.e., the imaginary component of the index of refraction, k, is approximately equal to zero so there is little absorption), and the real component of the index of refraction of these layers, n, is equal to the geometric mean of the indices of refraction of the layers on either side of these optical tuning layers. Thus, optical tuning layer 61 preferably is formed from a transparent material having an index of refraction which is equal to the geometric mean of the index of refraction of glass substrate 12 and the index of refraction of transparent conductive oxide layer 20. Similarly, optical tuning layer 62 preferably is formed from a transparent material having an index of refraction which is equal to the geometric mean of the indices of refraction of conductive oxide layer 22 and laminate layer 70. As used herein, the "geometric mean" refers to the square root of the mathematical product of the two indices of refraction.

Proper optical tuning is also a function of the thickness of optical tuning layers 61 and 62 which is preferably equal to one-fourth of the optical wavelength of the incident light. The optical wavelength through a layer is determined by dividing the wavelength of light in question by the index of refraction of the medium through which it is passing, i.e. layers 61 and 62. For visible light having wavelengths between about 400–650 nm, a useful approximation of optical wavelength can be made by dividing a wavelength of 540 nm by the index of refraction of the optical tuning layer. The thickness of the optical tuning layer can then be determined by dividing the optical wavelength by 4. Optical tuning layers used in combination with transparent conductive oxide layers, such as layers 20 and 22, desirably have a thickness of between about 60 nm and about 90 nm.

As an example of the foregoing, the following will demonstrate the method for selecting the index of refraction and thickness of optical tuning layer 61. Firstly, the desired index of refraction is determined by multiplying 1.5 (the index of refraction of glass substrate 12) times 2.1 (the index of refraction of transparent conductive oxide layer 20) and taking the square root of the product. This calculation yields an index of refraction of 1.77. The thickness of optical tuning layer 61 is then determined by dividing 540 nm by 1.77 to yield an optical wavelength of about 300 nm. Preferably, the thickness of optical tuning layer 61 is one-fourth of this value, or about 75 nm. The calculation for optical tuning layer 62 is performed in the same fashion.

Preferred materials for forming the discrete optical tuning layers of the present invention include transparent oxides, transparent nitrides, and a combination of transparent oxides and transparent nitrides. Particularly preferred are mixtures of the oxides of silicon and tin. In these mixtures, the silicon to tin ratio determines the index of refraction, with a higher silicon to tin ratio lowering the index of refraction and a lower silicon to tin ratio increasing the index of refraction. Other materials which can be used for the optical tuning layers are set forth in Gordon, U.S. Pat. Nos. 4,187,336 and 4,308,316, the disclosures of which are hereby incorporated herein. An appropriate selection of optical tuning layers 61 and 62 will minimize the optical interference at the interface between conductive oxide layer 20 and substrate 12 in the case of tuning layer 61, and at the interface between conductive oxide layer 22 and laminate layer 70 in the case of tuning layer 62.

Laminate layer 70 is an adhesive layer for adhering glass superstrate 14 to optical tuning layer 62. So that laminate layer 70 does not degrade the optical transmissivity of window 110, laminate layer 70 is preferably selected to have an index of refraction which is substantially the same as the index of refraction of glass superstrate 14, thereby minimizing any interference effects between these layers. In this regard, particularly suitable adhesives for laminate layer 70 are ethylene vinylacetate and polyvinylbutyral.

The electrochromic structure of window 110 is further distinguished from that of window 100 and prior art electrochromic devices in that the principle of optical tuning has been applied to ion conducting layer 41. In this case, optical interference at the interfaces between ion conducting layer 41 and the adjacent electrochromic electrode layer 30 and counterelectrode layer 50 can be substantially eliminated by forming ionic conducting layer 41 from a transparent material having an index of refraction which is approximately equal to the indices of refraction of electrochromic electrode layer 30 and counterelectrode layer 50. The indices of refraction of electrochromic electrode layer 30, ion conducting layer 41 and counterelectrode layer 50 may be adjusted by mixing the materials for forming these layers with materials having higher or lower indices of refraction to obtain the desired result. For example, where it is desired to provide an ion conducting layer 41 having an index of refraction greater than that provided by lithium silicate, mixtures of lithium silicate and titanium or zirconium may be used. When the indices of refraction of all three of these layers are approximately equal, interference at these interfaces will be substantially eliminated and optical transmission will be maximized.

In highly preferred embodiments, the indices of refraction of electrochromic electrode layer 30, ion conducting layer 41 and counterelectrode layer 50 are adjusted to be substantially similar to the indices of refraction of conductive oxide layers 20 and 22. Furthermore, because of the complementary nature of the above optical tuning processes, the thicknesses of layers 20 through 22 are no longer critical with respect to optical interference, thereby providing a much wider thickness tolerance during the formation of these layers.

Figure 5:
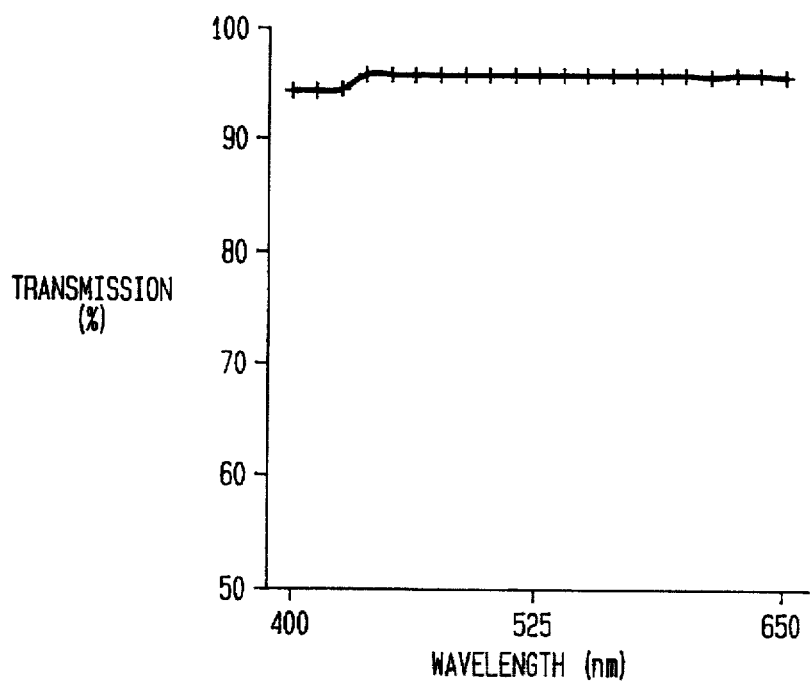
FIG. 5 is a graphical representation showing the optical transmission of the electrochromic device of FIG. 4 in the bleached state.

FIG. 5 shows the transmission of optical energy as a function of wavelength for a window 110 in the bleached state in which glass substrate 12 has an index of refraction of 1.5, optical tuning layer 61 has an index of refraction of 1.77 and a thickness of 75 nm, transparent conductive oxide layer 20 has an index of refraction of 2.1 and a thickness of 450 nm, electrochromic electrode layer 30 has an index of refraction of 2.1 and a thickness of 300 nm, ion conducting layer 41 has an index of refraction of 2.0 and a thickness of 200 nm, counterelectrode layer 50 has an index of refraction of 2.0 and a thickness of 200 nm, transparent conductive oxide layer 22 has an index of refraction of 2.1 and a thickness of 450 nm, optical tuning layer 62 has an index of refraction of 1.77 and a thickness of 75 nm, laminate layer 70 has an index of refraction of 1.5, and glass superstrate 14 has an index of refraction of 1.5. As clearly shown in FIG. 5, the foregoing characteristics produce a window 110 which exhibits excellent uniformity with respect to optical transmission.

Figure 6:
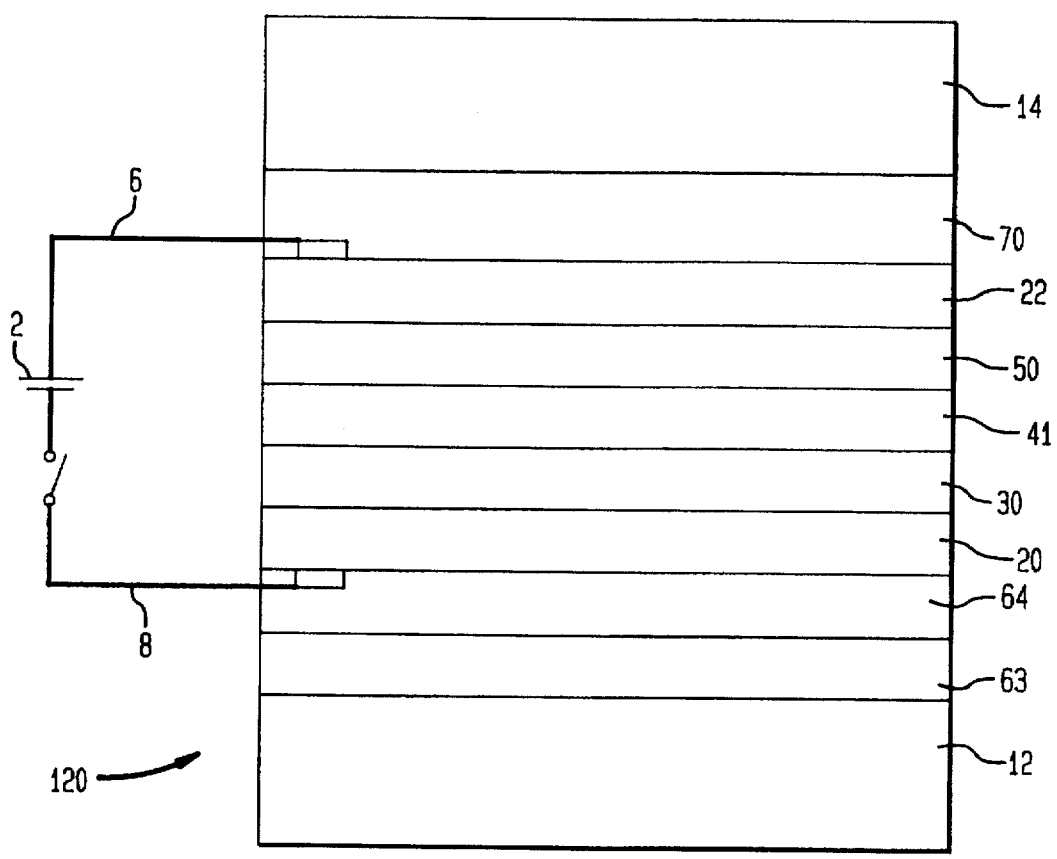
FIG. 6 is a highly schematic cross-sectional view of an electrochromic device in accordance with a further embodiment of the present invention.

A window 120 in accordance with an alternate embodiment of the present invention is shown schematically in FIG. 6. Window 120 is substantially the same as window 110 described above, except that optical tuning layer 61 has been replaced with a pair of optical tuning layers 63 and 64, and optical tuning layer 62 has been removed. The use of two optical tuning layers 63 and 64 provides advantages over the use of a single optical tuning layer. A first advantage is that two optical tuning layers provides an opportunity for more effective optical tuning to be achieved with a combined tuning layer thickness which is less than the thickness required for a single optical tuning layer. Another advantage to the use of two optical tuning layers is that each layer can be formed from more simple materials than can a single optical tuning layer, thereby avoiding the complex chemistry required to form such single layers. Techniques using two layers for optical tuning are disclosed in Gordon, U.S. Pat. Nos. 4,377,613 and 4,419,386, the disclosures of which are hereby incorporated herein.

Where two optical tuning layers 63 and 64 are used adjacent to one another, optical tuning may be achieved by selecting an optical tuning layer 64 which has an index of refraction which is significantly smaller than the index of refraction of layer 20, and by selecting an optical tuning layer 63 having an index of refraction which is significantly larger than the index of refraction of optical tuning layer 64, and most preferably which is substantially similar to the index of refraction of transparent conductive oxide layer 20. In such combination, the interference between the various interfaces will substantially cancel and transmission through the various layers will be maximized when layers 63 and 64 have appropriate thicknesses. Preferably, layer 64 will have an index of refraction between about 1.4 and 1.7 and layers 63 and 64 will have a combined thickness of between about 30 nm and about 70 nm, with layer 64 having a greater thickness than layer 63.

Figure 7:
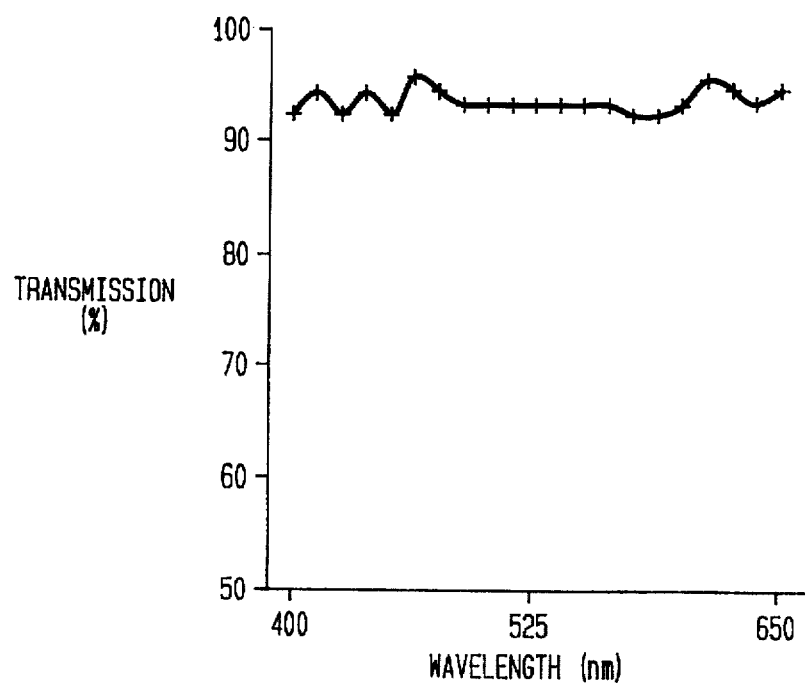
FIG. 7 is a graphical representation showing the optical transmission of the electrochromic device of FIG. 6 in the bleached state.

FIG. 7 shows the optical transmission through window 120 in the bleached state as a function of wavelength, where glass substrate 12 has an index of refraction of 1.5, optical tuning layer 63 has an index of refraction of 2.1 and a thickness of 20 nm, optical tuning layer 64 has an index of refraction of 1.5 and a thickness of 29 nm, transparent conductive oxide layer 20 has an index of refraction of 2.1 and a thickness of 450 nm, electrochromic electrode layer 30 has an index of refraction of 2.1 and a thickness of 300 nm, ion conducting layer 41 has an index of refraction of 2.0 and a thickness of 200 nm, counterelectrode layer 50 has an index of refraction of 2.0 and a thickness of 200 nm, transparent conductive oxide layer 22 has an index of refraction of 2.1 and a thickness of 450 nm, laminate layer 70 has an index of refraction of 1.5, and glass superstrate 14 has an index of refraction of 1.5. As can be seen from this figure, the optical transmission through window 120 is more uniform than through windows formed with no optical tuning layers (such as window 10), but is less uniform than through window 110. The primary reason for this inferior performance is the absence of an optical tuning layer between conductive oxide layer 22 and laminate layer 70 in the back end of the device.

An improvement in the optical transmission properties of window 120 can be achieved by adjusting the indices of refraction of electrochromic electrode layer 30, ion conducting layer 41 and counterelectrode layer 50 so that they are more similar to one another and to the indices of refraction of transparent conductive oxide layers 20 and 22.

A further slight improvement in the optical transmission properties of window 120 can be achieved by optimizing the index of refraction of laminate layer 70. This can be achieved by using a laminate layer 70 having an index of refraction which is the geometric mean of the indices of refraction of the transparent conductive oxide layer 22 and refraction of the glass superstrate 14. Since laminate layer 70 serves to adhere superstrate 14 to transparent conductive oxide layer 22, there is little opportunity to vary the thickness of this layer.

Rather than the foregoing methods for optically tuning transparent conductive oxide layer 20, this layer may be optically tuned by the use of two or more optical tuning layers selected so that the indices of refraction of the various layers gradually increase from the index of refraction of substrate 12 to the index of refraction of transparent conductive oxide layer 20. In that regard, layers 63 and 64 of window 120 may be replaced by two or more layers of monotonically increasing index of refraction. For example, for a device including a glass substrate 12 having an index of refraction of 1.5 and a transparent conductive oxide layer 20 having an index of refraction of 1.9, optical tuning layer 63 will desirably have an index of refraction of about $(1.5^2 \times 1.9)^{1/3}$ or 1.62, and optical tuning layer 64 will desirably have an index of refraction of about $(1.5 \times 1.9^2)^{1/3}$ or 1.76. The thicknesses of layers 63 and 64 are desirably about 60 nm and 53 nm, respectively, as determined by optical modeling to achieve maximum transmission. Where desirable, a series of more than two adjacent optical tuning layers may be used to further enhance the optical tuning affect.

For the embodiments of the invention having the structure of window 110 or window 120 described above, it has been desirable that the transparent conductive oxide layers 20 and 22, the electrochromic electrode layer 30, the ion conducting layer 41, and the counterelectrode layer 50 all have about the same index of refraction. When that is the case, the thicknesses of these layers are largely immaterial and optimum optical tuning is achieved, i.e., these windows exhibit a minimum amount of iridescence. If there is a substantial mismatch in the indices of refraction for these layers, however, some optical tuning may still be accomplished by adjusting the thicknesses of the layers. To illustrate, each of the layers of window 120 may have the indices of refraction and thicknesses as described above in connection with FIG. 7, except that ion conducting layer 41 may have an index of refraction of 1.5. To minimize iridescence in this scenario, the thickness of ion conducting layer 41 should be reduced to between about 130 nm and about 160 nm as determined by optical modeling to achieve maximum transmission through the window.

Figure 8:
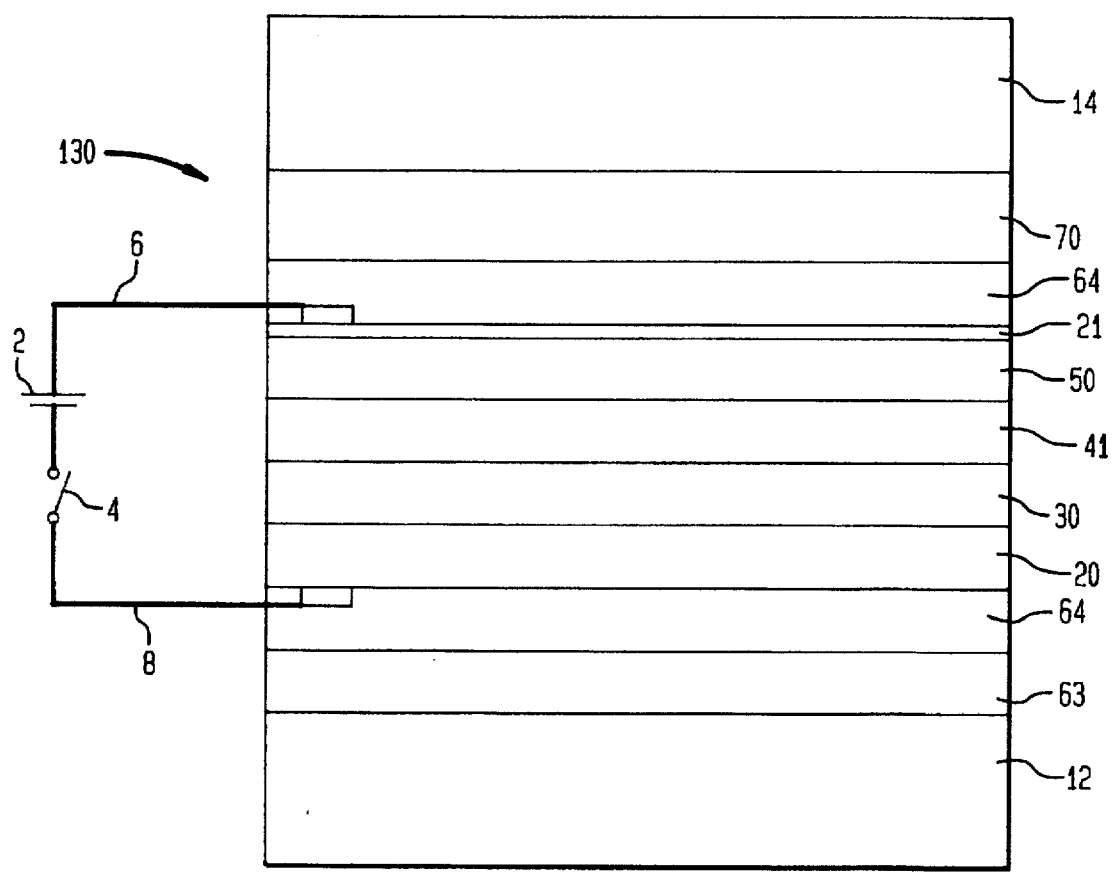
FIG. 8 is a highly schematic cross-sectional view of an electrochromic device in accordance with still another embodiment of the present invention.

A window 130 in accordance with a still further embodiment of the present invention is shown in schematic cross-section in FIG. 8. Window 130 is similar to window 120 described above, with the exception that transparent conductive oxide layer 22 has been replaced with a conductive metal layer 21 and an optical tuning layer 64. Layers 21 and 64 may be substantially similar to layers 21 and 60 of window 100 described above, and coact with the other layers in the same manner as in window 120 to provide an optically tuned, optically transparent electrochromic window.

Figure 9:
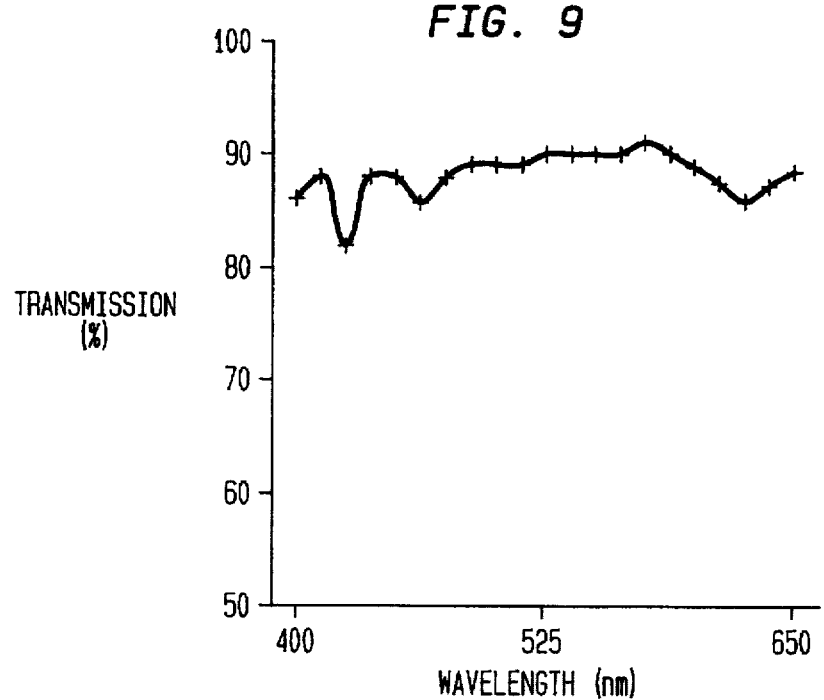
FIG. 9 is a graphical representation showing the optical transmission of the electrochromic device of FIG. 8 in the bleached state.

FIG. 9 shows the optical transmission as a function of wavelength in the bleached state of a window 130 whose layers have the same indices of refraction and thicknesses as described above in connection with window 120, and wherein conductive metal layer 21 is silver having a thickness of 10 nm and optical tuning layer 64 is a transparent oxide having an index of refraction of 2.5 and a thickness of 30 nm. As can be seen from this figure, the structure of window 130 provides good uniformity of optical transmission with respect to wavelength. Moreover, a comparison of FIGS. 7 and 9 indicates that windows that incorporate conductive metal layers can exhibit optical transmission which is similar to the optical transmission through windows which utilize transparent conductive oxide layers rather than conductive metal layers.

Figure 10:
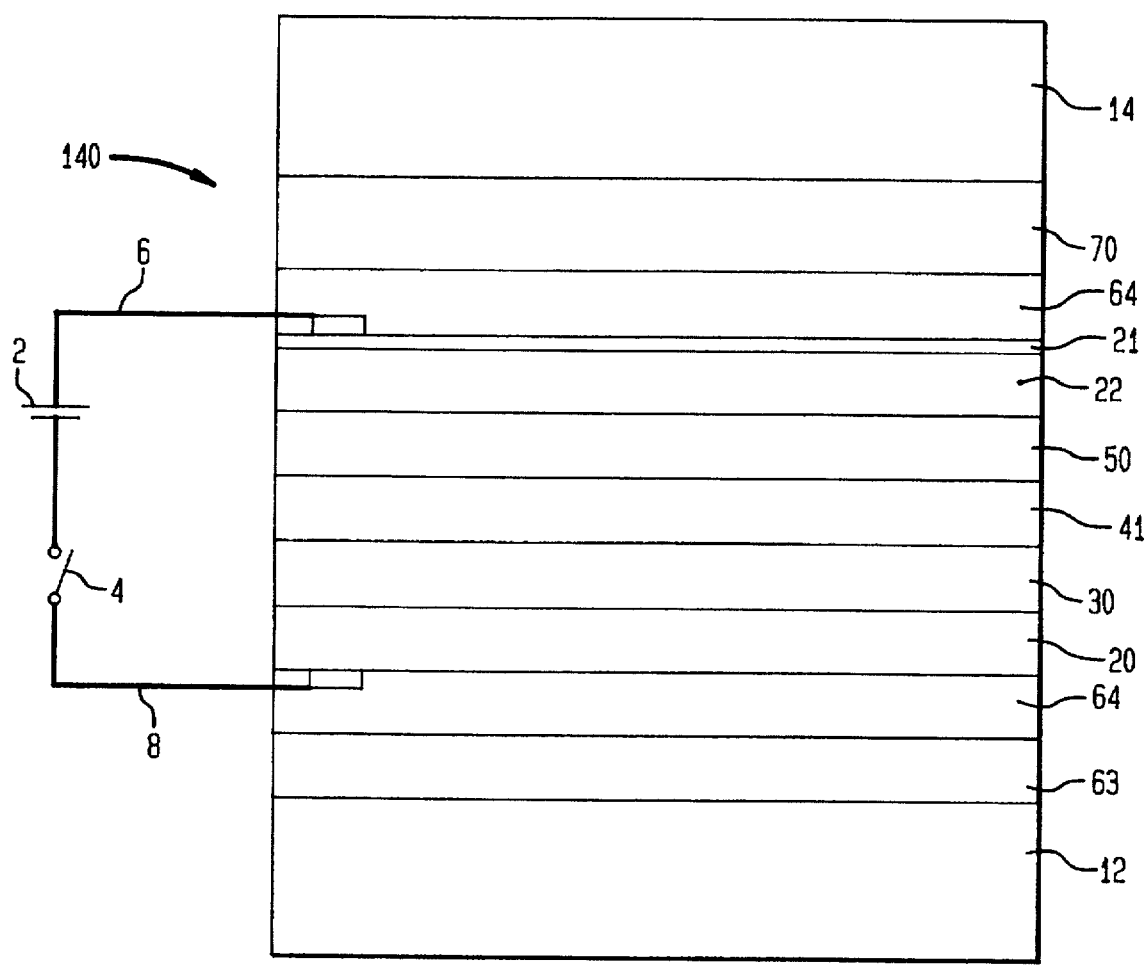
FIG. 10 is a highly schematic cross-sectional view of an electrochromic device in accordance with yet another embodiment of the present invention.

Still another embodiment of a window 140 in accordance with the present invention is shown schematically in FIG. 10. Window 140 is substantially the same as window 130 described above, except that an intermediate layer 22 has been added between conductive metal layer 21 and counterelectrode layer 50. In one embodiment, intermediate layer 22 is formed from a transparent electrically conductive oxide, combining with conductive metal layer 21 to provide a laminate having a lower overall sheet resistance which will improve switching time between the bleached and colored states. This improved switching can thus be accomplished without deteriorating the optical properties of the device as would happen if the thickness of the conductive metal layer 21 were substantially increased. Further, transparent electrically conductive oxide layer 22 may serve as a diffusion barrier to prevent unwanted diffusion between the counterelectrode layer 50 and the conductive metal layer 21.

In another embodiment, intermediate layer 22 may be in the form of a metal layer having a thickness of less than about 2 nm. In this embodiment, the metal layer typically serves one of the same functions as layers formed from transparent electrically conductive oxides, that is it prevents unwanted diffusion between the counterelectrode layer 50 and the conductive metal layer 21. Preferred metals for forming layer 22 include metals which are highly stable or inert. A particularly preferred metal in that regard is nickel. Regardless of the material for forming intermediate layer 22, optical tuning layer 64 again preferably has an index of refraction of greater than 1.9 and a thickness of between about 10 nm and about 50 nm.

Figure 11:
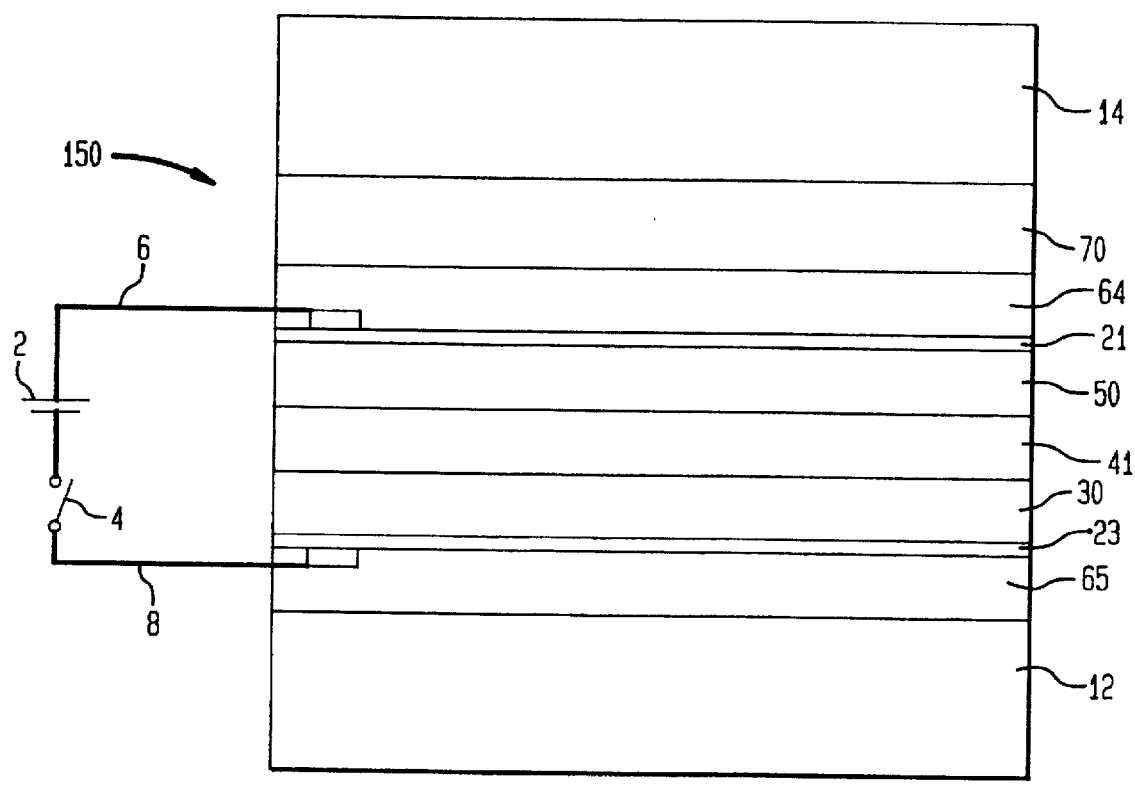
FIG. 11 is a highly schematic cross-sectional view of an electrochromic device in accordance with a still further embodiment of the present invention.

A window 150 in accordance with yet another embodiment of the present invention is shown schematically in FIG. 11. Window 150 is substantially the same as window 130, except that transparent oxide layer 20 and optical tuning layers 63 and 64 have been replaced by conductive metal layer 23 and optical tuning layer 65, respectively, thereby placing a constraint on the combined thickness of layers 30, 41 and 50. It is desirable in this embodiment that layers 30, 41 and 50 have similar indices of refraction and that the combined thickness of these layers be as thin as possible, subject to the restraint of a maximum transmission at a chosen wavelength between about 400 nm and 650 nm. For example, if layers 30, 41 and 50 each have indices of refraction of about 2.2, then their combined thickness preferably would be about 50 nm or about 300 nm as determined by optical modeling to achieve maximum optical transmission. In this embodiment, conductive metal layer 23 is similar to conductive metal layer 21, and optical tuning layer 65 is similar to optical tuning layer 64.

In another embodiment of the invention, (not shown) optical tuning layer 64 of window 130, 140 or 150 may be formed from an electrically conductive transparent oxide. In this event, the manufacture of these devices may be simplified by connecting wires 6 and 8 to layer 64 rather than to conductive metal layer 21, thereby avoiding the masking or etching steps which would otherwise be required.

As discussed above, the electrochromic devices of the present invention are typically built upon a substrate, such as a glass substrate 12. This substrate not only supports the very thin layers of these devices during fabrication and use, but also protects the layers from damage resulting from exposure to the environment. A superstrate, such as glass superstrate 14, provides further support and protection. Although each of the embodiments of the present invention have been described in connection with a substrate and a superstrate made from glass, other substrate and superstrate materials may be used, including transparent ceramic materials and rigid and flexible transparent plastics. In that regard, the embodiment shown in FIG. 11 is particularly applicable to plastic substrates since the conductive metal layer 23 can be applied at relatively low temperatures. Furthermore, it is contemplated that electrochromic devices may initially be formed on plastic substrates and the entire assembly then applied to windows and other such structures.

Furthermore, the embodiments of the present invention discussed above contemplate the deposition of layers successively from substrate 12 to superstrate 14 using ion conducting layers formed from ceramic materials. It will be appreciated, however, that optically tuned devices may be formed by assembling two "one-half" structures to opposite sides of a polymer sheet which will then serve as the ion conducting layer. For example, window 110 can be produced by forming layers 61, 20 and 30 on substrate 12, forming layers 62, 22 and 50 on superstrate 14 (layer 70 would no longer be necessary in this arrangement), and then sandwiching these two portions together around an ion conducting, electrically insulating polymer sheet which will thus serve as ion conducting layer 41.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as set forth in the appended claims.

We claim:

1. An electrochromic device, comprising an electrochromic structure including an elelectrochromic mate an electrochromic material, a counterelectrode and transporting means for transporting ions between said electrode and said counterelectrode, conductive means including at least two electrically conductive layers sandwiching said electrochromic structure for applying an electric potential across said electrochromic structure, at least one of said electrically conductive layers including a layer of an electrically conductive oxide, a substrate and a superstrate together cooperating to sandwich said electrochromic structure and said electrically conductive layers, and enhancing means for enhancing the transmission of radiation through said electrically conductive layers, said enhancing means including at least one optically transparent layer including silicon dioxide in surface contact with said substrate and at least one other optically transparent layer including silicon dioxide in surface contact with said superstrate.

2. The electrochromic device as claimed in claim 1, wherein said at least one optically transparent layer is interposed between said substrate and said one of said electrically conductive layers, and said at least one other optically transparent layer is interposed between said superstrate and another of said electrically conductive layers.

3. The electrochromic device as claimed in claim 1, wherein said one of said electrically conductive layers between said electrochromic structure and said substrate includes a transparent oxide and said at least one optically transparent layer is interposed between said substrate and said one of said electrically conductive layers in surface contact with said transparent oxide.

4. An electrochromic combination, comprising a substrate, and an electrochromic device arranged on said substrate, said electrochromic device including an electrochromic structure having an electrode formed from an electrochromic material, a counterelectrode, lithium ions and transporting means for transporting said lithium ions between said electrode and said counterelectrode, conductive means including at least two electrically conductive layers sandwiching said electrochromic structure for applying an electric potential across said electrochromic structure, at least one of said electrically conductive layers between said electrochromic structure and said substrate including a transparent conductive oxide and excluding a metal layer, and enhancing means for enhancing the transmission of radiation through said at least one of said electrically conductive layers, said enhancing means including at least one optically transparent layer in surface contact with said substrate.

5. The electrochromic combination as claimed in claim 4, wherein said at least one optically transparent layer is interposed between said substrate and said at least one of said electrically conductive layers.

6. An electrochromic combination, comprising a substrate, an electrochromic device arranged on said substrate, said electrochromic device including an electrochromic structure having an electrode formed from an electrochromic material, a counterelectrode and transporting means for transporting ions between said electrode and said counterelectrode, conductive means including at least two electrically conductive layers sandwiching said electrochromic structure for applying an electric potential across said electrochromic structure, at least one of said electrically conductive layers between said electrochromic structure and said substrate including a transparent conductive oxide and excluding a metal layer, and enhancing means for enhancing the transmission of radiation through said at least one of said electrically conductive layers, said enhancing means including at least one optically transparent layer including silicon dioxide in surface contact with said substrate, and a superstrate cooperating with said substrate to sandwich said electrochromic device.

7. An electrochromic combination, comprising a substrate, and an electrochromic device arranged on said substrate, said electrochromic device including an electrochromic structure having an electrode formed from an electrochromic material, a counterelectrode, lithium ions and transporting means for transporting said lithium ions between said electrode and said counterelectrode, conductive means including at least two electrically conductive layers sandwiching said electrochromic structure for applying an electric potential across said electrochromic structure, and enhancing means for enhancing the transmission of radiation through said electrically conductive layers, said enhancing means including at least two optically transparent layers sandwiching said electrochromic structure and said electrically conductive layers, one of said optically transparent layers being in surface contact with said substrate.

8. The electrochromic combination as claimed in claim 7, wherein said at least two optically transparent layers have an index of refraction greater than about 1.5.

9. The electrochromic combination as claimed in claim 7, wherein said one of said optically transparent layers is interposed between said substrate and said one of said electrically conductive layers.

10. An electrochromic combination, comprising a substrate, an electrochromic device arranged on said substrate, said electrochromic device including an electrochromic structure having an electrode formed from an electrochromic material, a counterelectrode and transporting means for transporting ions between said electrode and said counterelectrode, conductive means including at least two electrically conductive layers sandwiching said electrochromic structure for applying an electric potential across said electrochromic structure, and enhancing means for enhancing the transmission of radiation through said electrically conductive layers, said enhancing means including at least two optically transparent layers sandwiching said electrochromic structure and said electrically conductive layers, one of said optically transparent layers being in surface contact with said substrate, at least one of said optically transparent layers including silicon dioxide, and a superstrate cooperating with said substrate to sandwich said electrochromic device.

11. The electrochromic combination as claimed in claim 10, wherein said one of said optically transparent layers is interposed between said substrate and said one of said electrically conductive layers, and another one of said optically transparent layers is interposed between said superstrate and another of said electrically conductive layers.

12. An electrochromic combination, comprising a substrate, and an electrochromic device arranged on said substrate, said electrochromic device including an electrochromic structure having an electrode formed from an electrochromic material, a counterelectrode, lithium ions and transporting means for transporting said lithium ions between said electrode and said counterelectrode, conductive means including at least two electrically conductive layers sandwiching said electrochromic structure for applying an electric potential across said electrochromic structure, at least one of said electrically conductive layers between said electrochromic structure and said substrate including a transparent oxide, and enhancing means for enhancing the transmission of radiation through said at least one of said electrically conductive layers, said enhancing means including at least one optically transparent layer interposed between said substrate and said at least one of said electrically conductive layers in surface contact with said transparent oxide.

13. An electrochromic combination, comprising a substrate, an electrochromic device arranged on said substrate, said electrochromic device including an electrochromic structure having an electrode formed from an electrochromic material, a counterelectrode and transporting means for transporting ions between said electrode and said counterelectrode, conductive means including at least two electrically conductive layers sandwiching said electrochromic structure for applying an electric potential across said electrochromic structure, at least one of said electrically conductive layers between said electrochromic structure and said substrate including a transparent oxide, and enhancing means for enhancing the transmission of radiation through said at least one of said electrically conductive layers, said enhancing means including at least one optically transparent layer including silicon dioxide interposed between said substrate and said at least one of said electrically conductive layers in surface contact with said transparent oxide, and a superstrate cooperating with said substrate to sandwich said electrochromic device.

14. The electrochromic combination as claimed in claim 4, further comprising a superstrate cooperating with said substrate to sandwich said electrochromic device.

15. The electrochromic combination as claimed in claim 7, further comprising a superstrate cooperating with said substrate to sandwich said electrochromic device.

16. The electrochromic combination as claimed in claim 12, further comprising a superstrate cooperating with said substrate to sandwich said electrochromic device.

17. An electrochromic combination, comprising a substrate, and an electrochromic device arranged on said substrate, said electrochromic device including an electrochromic structure having an electrode formed from an electrochromic material, a counterelectrode and transporting means consisting of only a single layer for transporting ions between said electrode and said counterelectrode, conductive means including at least two electrically conductive layers sandwiching said electrochromic structure for applying an electric potential across said electrochromic structure, at least one of said electrically conductive layers between said electrochromic structure and said substrate including a transparent conductive oxide and excluding a metal layer, and enhancing means for enhancing the transmission of radiation through said at least one of said electrically conductive layers, said enhancing means including at least one optically transparent layer including silicon dioxide in surface contact with said substrate.

18. An electrochromic combination, comprising a substrate, and an electrochromic device arranged on said substrate, said electrochromic device including an electrochromic structure having an electrode formed from an electrochromic material, a counterelectrode and transporting means consisting of only a single layer for transporting ions between said electrode and said counterelectrode, conductive means including at least two electrically conductive layers sandwiching said electrochromic structure for applying an electric potential across said electrochromic structure, and enhancing means for enhancing the transmission of radiation through said electrically conductive layers, said enhancing means including at least two optically transparent layers sandwiching said electrochromic structure and said electrically conductive layers, one of said optically transparent layers being in surface contact with said substrate, at least one of said optically transparent layers including silicon dioxide.

19. An electrochromic combination, comprising a substrate, and an electrochromic device arranged on said substrate, said electrochromic device including an electrochromic structure having an electrode formed from an electrochromic material, a counterelectrode and transporting means consisting of only a single layer for transporting ions between said electrode and said counterelectrode, conductive means including at least two electrically conductive layers sandwiching said electrochromic structure for applying an electric potential across said electrochromic structure, at least one of said electrically conductive layers between said electrochromic structure and said substrate including a transparent oxide, and enhancing means for enhancing the transmission of radiation through said at least one of said electrically conductive layers, said enhancing means including at least one optically transparent layer including silicon dioxide interposed between said substrate and said at least one of said electrically conductive layers in surface contact with said transparent oxide.

* * * * *

UNITED STATES PATENT AND TRADEMARK OFFICE
CERTIFICATE OF CORRECTION

PATENT NO. : 5,724,177
DATED      : March 3, 1998
INVENTOR(S) : Ellis, Jr. et al.

It is certified that error appears in the above-identified patent and that said Letters Patent is hereby corrected as shown below:

Column 14, lines 30-31, "elelectrochromic mate" should read --electrode formed from--.

Signed and Sealed this

Sixteenth Day of June, 1998

Attest:

BRUCE LEHMAN

Attesting Officer

Commissioner of Patents and Trademarks